United States Patent
Hartley et al.

(10) Patent No.: US 6,951,681 B2
(45) Date of Patent: Oct. 4, 2005

(54) SUBSTRATE MOUNTING FOR ORGANIC, DIELECTRIC, OPTICAL FILM

(75) Inventors: Scott M. Hartley, Clarks Summit, PA (US); Robert A. Sallavanti, Dalton, PA (US)

(73) Assignee: GENTEX Corporation, Carbondale, PA (US)

( * ) Notice: Subject to any disclaimer, the term of this patent is extended or adjusted under 35 U.S.C. 154(b) by 5 days.

(21) Appl. No.: 10/734,872

(22) Filed: Dec. 12, 2003

(65) Prior Publication Data

US 2004/0183219 A1 Sep. 23, 2004

Related U.S. Application Data

(62) Division of application No. 09/955,903, filed on Sep. 19, 2001, now Pat. No. 6,676,859.

(51) Int. Cl.[7] .................................................. B32B 7/02
(52) U.S. Cl. ........................ 428/212; 428/457; 428/458; 428/461; 428/480; 428/483; 359/359; 359/360; 359/580; 359/585; 359/588; 359/589
(58) Field of Search .................................. 428/212, 457, 428/458, 461, 480, 483; 359/359, 360, 580, 585, 588, 589

(56) References Cited

U.S. PATENT DOCUMENTS

| | | |
|---|---|---|
| 5,122,906 A | 6/1992 | Wheatley |
| 5,540,978 A | 7/1996 | Schrenk |
| 5,882,774 A | 3/1999 | Jonza et al. |
| 5,965,246 A | 10/1999 | Guiselin et al. |
| 6,049,419 A | 4/2000 | Wheatley et al. |
| 6,080,467 A | 6/2000 | Weber et al. |
| 6,086,810 A | 7/2000 | Inagaki et al. |
| 6,111,697 A | 8/2000 | Merrill et al. |
| 6,157,486 A | 12/2000 | Benson, Jr. et al. |
| 6,159,608 A | 12/2000 | Friedman et al. |
| 6,180,033 B1 | 1/2001 | Greshes |
| 6,194,061 B1 | 2/2001 | Satoh et al. |
| 6,208,466 B1 | 3/2001 | Liu et al. |
| 6,210,785 B1 | 4/2001 | Weber et al. |
| 6,221,304 B1 | 4/2001 | Harris et al. |
| 6,451,414 B1 * | 9/2002 | Wheatley et al. ............ 428/212 |
| 6,641,900 B2 * | 11/2003 | Hebrink et al. ............. 428/212 |

* cited by examiner

*Primary Examiner*—Rena Dye
*Assistant Examiner*—Timothy Speer
(74) *Attorney, Agent, or Firm*—Keusey, Tutunjian & Bitetto, P.C.

(57) ABSTRACT

A method for optically coupling a thermoplastic material to an outer surface layer of an organic, dielectric, optical film and the resulting optical filter. Initially, a dielectric film is selected that includes (i) repeating optical layers of at least two polymers having different refractive indexes from each other, (ii) an exterior film surface, (iii) a refractive boundary along the exterior film surface, and (iv) a delamination threshold based on total thermal energy delivered to the film. A thermoplastic material which is miscible with the exterior film surface is fused to the refractive boundary with thermal energy below the delamination threshold to form a polydisperse region having a higher optical transmission than the refractive boundary. Add-on filters in the form of hardcoat layers, anti-reflection layers, holograms, metal dielectric stacks and combinations of these may be combined with the thermoplastic-film construct.

33 Claims, 2 Drawing Sheets

SUBSTRATE MOUNTING FOR ORGANIC, DIELECTRIC, OPTICAL FILM

RELATED APPLICATION INFORMATION

This application is a Divisional application of U.S. patent application Ser. No. 09/955,903 filed on Sep. 19, 2001, now U.S. Pat. No. 6,676,859.

BACKGROUND OF THE INVENTION

1. Field of the Invention

The invention relates to methods for mounting thermoplastic substrates to organic, dielectric films and the resulting optical filters. More particularly, it relates to methodologies for fusing, through a variety of industrial processes, thermoplastic substrates to dielectric films without delamination while improving optical transmission at the film's refractive boundary.

2. Description of the Prior Art

Dielectric stacks have previously been constructed by sputtering layers of inorganic (metal) oxides onto polymeric substrates. The layers alternate between high and low indices of refraction, whereby incoming light encounters a partial mirror at each new layer. By creating so-called quarter wave stacks, certain wavelengths can be destructively interfered via Bragg diffraction. These constructs possess several advantages as follows: they are intimately, optically coupled to the substrate thereby providing high transmissions; they are custom engineered for the shape and curvature of each particular part. However, numerous disadvantages exist with these constructs as follows: the labor, materials and equipment costs for manufacturing are prohibitive; the mechanical coupling of metal oxide layers onto polymeric substrates is subject to delamination from flexural stress; the differing rates of thermal expansion between the metal oxides and the polymeric substrate can also cause delamination.

Recently, dielectric stacks have been manufactured from alternating layers of polymers having high and low indices of refraction, creating organic, optical, dielectric films. Several examples of these films are described in U.S. Pat. No. 5,882,774, entitled Optical Film, the contents of which are incorporated herein by reference thereto. The different polymers have similar mechanical properties and melting temperature profiles allowing hundreds of layers to be stacked and stretched to control the thickness and optically tune the film. While this allows the film to be economically manufactured, a problem exists in optically coupling the film to other components, for example, an optical thermoplastic substrate. Because the delicate film is highly susceptible to delamination, melting, burning or having its desirable transmission properties altered, previous attempts to mount the film have been limited to adhesion via optical fluids or optical adhesives. While these methods are adequate, they severely reduce the film's high transmission characteristics, by providing refractive boundaries from film-to-adhesive and from adhesive-to-substrate.

Accordingly, it would be desirable to mount the film onto a substrate with structural and mechanical integrity while maintaining, or enhancing, the film's transmission characteristics.

SUMMARY OF THE INVENTION

It is therefore an object of the invention to provide a variety of methods for manufacturing optical filters that incorporate organic, dielectric films.

It is a further object of the invention to provide industrial processes for fusing thermoplastic substrates to dielectric films without delamination while improving optical transmission at the film's refractive boundary.

It is yet another object of the present invention to describe criteria for selecting chemical and material properties of thermoplastics which can be effectively utilized in the film fusing methods.

It is another object of the present invention to describe criteria for thermally fusing the film to a thermoplastic substrate based on the chosen manufacturing method.

It is a further object of the present invention to describe the optical properties of the thermally fused region.

These and other related objects are achieved according to the invention by a method for optically coupling a thermoplastic material to an outer surface layer of an organic, dielectric, optical film. A dielectric film is selected that includes (i) repeating optical layers of at least two polymers having different refractive indexes from each other, (ii) an exterior film surface, (iii) a refractive boundary along the exterior film surface, and (iv) a delamination threshold based on total thermal energy delivered to the film. Next, a thermoplastic material which is miscible with the exterior film surface is selected. The thermoplastic material is fused to the refractive boundary with thermal energy below the delamination threshold to form a polydisperse region having a higher optical transmission than the refractive boundary. The molecular weight of the thermoplastic is selected so that the melting temperature range of the thermoplastic overlaps the melting temperature range of the exterior film surface.

Fusing may be accomplished by film insert molding, where the thermoplastic is simultaneously molded into a substrate and fused to the film's refractive boundary. The molten resin is held above the resin's glass transition temperature in the barrel and experiences a temperature drop as it enters the cavity to below the film's thermal delamination threshold.

Fusing may also be accomplished via laser welding where a radiation absorbing material is placed near one of the refractive boundaries and irradiating the absorbing material through the thermoplastic or the film.

Fusing may further be accomplished by extruding the thermoplastic into a substrate and bringing the film into contact with the substrate as the substrate's temperature drops below the thermal delamination threshold.

The optical filters manufactured according to the methods of the invention, may have incorporated therein, organic absorber dyes, such as a UV absorbing dye, a visible light absorbing dye, a cosmetic dye, a laser absorbing dye, a near infrared absorbing dye, and infrared absorbing dye and combinations thereof. Add-on filters in the form of hardcoat layers, anti-reflection layers, holograms, metal dielectric stacks and combinations of these may be combined with the thermoplastic-film construct.

BRIEF DESCRIPTION OF THE DRAWINGS

In the drawings wherein like reference numeral denote similar components throughout the views.

DETAILED DESCRIPTION OF PREFERRED EMBODIMENTS

In U.S. Pat. No. 5,882,774 films are stacked together to improve transmission spectra. For example, a pair of 204-layer polarizers made from alternating layers of PEN and coPEN are laminated together. More specifically, the outer coPEN layer on one polarizer is laminated to the outer coPEN layer of the other polarizer. In this instance, an optical adhesive is used: wherein the only important property of the adhesive is that it possesses a refractive index as close to the coPEN as possible. In other instances a relatively thick skin layer is formed on the exterior surface of the film. In the above example, the skin layer would be formed from PEN or coPEN. In any event, the skin layer is made from one of the polymers used in the film.

Figure 1:
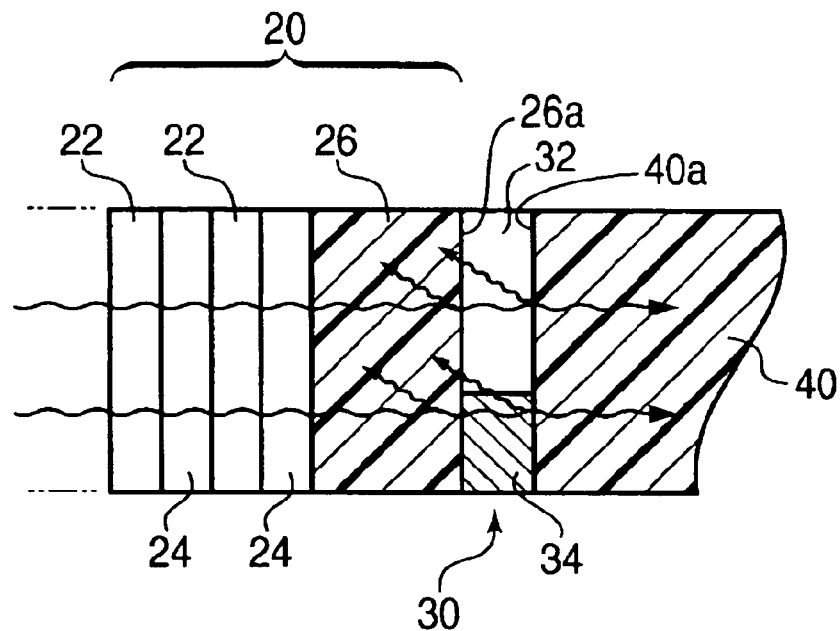
FIG. 1 is a cross-sectional view of an organic, optical, dielectric film layered on a thermoplastic substrate with air and adhesive disposed therebetween.

As can be seen in FIG. 1, a problem exists in layering a film 20 onto a substrate 40. For example, coupling a film 20 made from alternating layers 22, 24 of PEN and coPEN (or PEN and PMMA) to a substrate 40 having different mechanical, chemical or optical properties. The numbers 22 and 24 may also represent any pair of polymers used in organic, optical, dielectric films. In layering the film onto the substrate, an intermediate medium 30 occupies any spaces or gaps therebetween. The intermediate medium 30 may be adjacent one of the alternating layers 22 or 24, or it may be adjacent a skin 26 made from one of the polymers of the film and made several times thicker than the layers, for example. In the simplest case, the intermediate medium 30 consists of air 32. Alternatively, the intermediate medium 30 consists of an adhesive 34, or optical grade adhesive, having an index of refraction matching the film, the substrate or some value in between. These layered constructs possess two refractive boundaries: the first refractive boundary is disposed at the film exterior or skin exterior 26a, where the film or skin meets the air 32 or adhesive 34; and the second refractive boundary is disposed at the substrate exterior 40a, where the air 32 or adhesive 34 meets the substrate. These refractive boundaries 26a and 40a act as partial mirrors reflecting light at all wavelengths and reducing the overall transmission of the resulting filter. As can be appreciated, such reduction eliminates the desirable high efficiency of the film. This reduction is illustrated by a light wave passing through the ensemble from left to right in FIG. 1. Note that as the light wave crosses 26a and 40a some portion of the light is reflected, regardless of the material properties of the intermediate medium 30.

Applicants attempted to bond film to substrate without the introduction of an intermediate adhesive. However, since the film contains hundreds of layers, such initial attempts were met with numerous instances of delaminating portions of the film or destroying the optical properties of the film when the film remained intact. Some of these attempts involved thermally bonding or fusing the film to the substrate. In contrast to the simple selection of a refractive-matching adhesive, successful thermal bonding required the optimization of three variables: the melt flow of the polymer; the melting temperature range of the polymer; and the miscibility of the polymer with the outer film layer. The goal of the aforesaid optimization is to thermoform a thermoplastic substrate onto a film surface without destroying the film. It is believed that the delamination threshold is a function of total heat energy delivered to the film in a manner where the heat energy penetrates into the film layers and builds faster than it can be laterally dissipated.

Thermoplastic polymers are typically graded by molecular weight and initially the selection process begins here. While the melting temperature range of a polymer correlates approximately with the molecular weight, the melt flow of the polymer correlates reciprocally with the molecular weight. The melt flow determines the ease with which the polymer can be thermoformed via mold, rollers, extrusion or other mechanical former. In addition, it determines the ease with which the polymer can be delivered to the film surface. However, a low melt flow will be present with a high melting temperature range leading to film delamination or destruction. It was determined that the melting temperature range of the polymer must at least partially overlap the melting temperature range of the outer film layer to which it will be fused.

More importantly, the film is constructed of two or more materials, which have their melting temperature ranges in numerical proximity to each other, but which are not identical. The manner in which thermoforming is performed determines the total heat energy which is delivered to the film. Applicant's discovered that the total energy delivered to the lower melting temperature range layer determines if delamination occurs, and hereby defines such phenomenon as the delamination threshold. In other words, any successful thermoforming process must limit the total heat energy delivered into the stack to below the delamination threshold.

Figure 2:
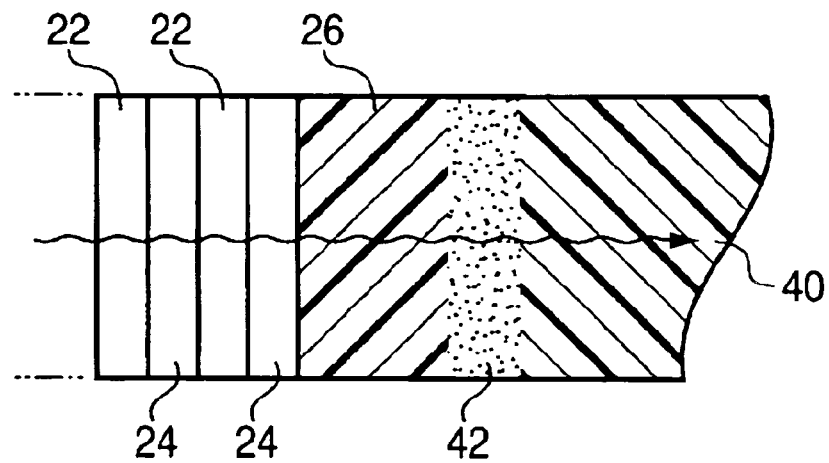
FIG. 2 is a cross-sectional view of an organic, optical, dielectric film fused to a thermoplastic substrate pursuant to the method, and resulting product, according to the invention.

Initial restrictions in polymer selection are as follows: the polymer is miscible with the outer film layer, the molecular weight of the polymer provides a melting temperature range that at least partially overlaps the melting temperature range of the outer film layer. Miscibility likely will require matching the polarity of the polymer to the film layer. Surprisingly, applicants discovered that at the tail end of the thermoforming process, the polymer can be brought into contact with the outer film layer causing both materials to jointly form a polydisperse layer while staying below the delamination threshold. Such polydisperse layer is characterized by a polymeric mix of the materials via polymer melting or polymer interfusing creating a continuous transition there between without intermediate mediums such as air or adhesive. The ensembles according to the invention replaces those intermediate mediums with gradual transitions thereby eliminating any finite optical boundaries. As illustrated in FIG. 2, the polydisperse layer 42 provides a smooth and continuous transition from the outer film layer, i.e. skin 26, to the polymer substrate 40, thereby eliminating the two original refractive boundaries. In several instances, the optical transmission of the film was not lowered by the addition of the polymer into the optical path, even though the Beer-Lambert Law predicts that the combined transmission of two filters will be the product of their individual transmissions.

Injection Molding Example

Polycarbonate was maintained in the barrel at 545 to 550 degrees F., well above the film's delamination threshold.

The polycarbonate was injected into the molding cavity into which the film was previously insert against a 170 degree F. mold surface. As the polycarbonate was injected into the cavity it experienced a temperature drop. The portion of the mold adjacent the gate receives the greatest amount of total heat energy and caused delamination of the film. However, portions of the mold spaced from the gate had the polycarbonate tenaciously fused or bonded to the film, and not at all prone to spontaneous or induced exfoliation. Such bonding strengths were confirmed using standardized mechanical tests.

In one test polycarbonate having an average transmission across the visible spectrum of 85% was injected and fused to a near infrared absorbing film having an average transmission across the visible spectrum of 79%. When these filters are layered, the Beer-Lambert law predicts that transmissions across the visible spectrum will experience an 85% reduction followed by a 79% reduction, wherein the total light wave of FIG. 1 passing through film 20, skin exterior 26a, intermediate medium 30 which in this instance consisted of air 32, substrate exterior 40a, and substrate 40. Note that the expected, or predicted values in column 56 are numerically consistent with the actual transmission values in column 58.

Column 60 indicates the transmissions of the polycarbonate fused to the film, according to the invention. This represents the light wave of FIG. 2 passing through film 20, polydisperse layer 42, and substrate 40, without encountering refractive boundaries between the skin 26 and the substrate 40. By fusing the substrate to the film, according to invention, without delaminating the film, the transmission loss predicted by the Beer-Lambert Law is unexpectedly eliminated, resulting in an average 10% increase in transmission.

TABLE 1

Transmission Values (in percent, %) at 50 nm Increments

| nm | Bayer Water white (clear) PC | Film | PC * Film B-L Law Expected Transmission | PC-Film Layered Actual Transmission | PC-Film Molded Actual Transmission | % Increase from Layered to Molded |
|---|---|---|---|---|---|---|
| 450 | 84.5 | 83.9 | 70.9 | 70.8 | 81.6 | 15.3 |
| 500 | 86.5 | 87.3 | 75.5 | 75.5 | 82.4 | 9.1 |
| 550 | 87.4 | 87.6 | 76.6 | 76.5 | 84.2 | 10.1 |
| 600 | 87.6 | 89.8 | 78.7 | 78.7 | 85.8 | 9.0 |
| 650 | 88.3 | 88.5 | 78.1 | 78.2 | 85.5 | 9.3 |
| 700 | 89.5 | 87.7 | 78.5 | 78.5 | 86.1 | 9.7 |
| 750 | 90.1 | 87.9 | 79.2 | 79.2 | 86.9 | 9.7 |
|  | Avg. Trans. | Avg. Trans. | Avg. Trans. | Avg. Trans. | Avg. Trans. | Avg. Increase |
|  | 87.7 | 87.5 | 76.8 | 76.8 | 84.6 | 10.3 |
| (50) | (52) | (54) | (56) | (58) | (60) | (62) | transmission is calculated as the product of the individual filters transmissions, i.e. 85%×79%=67%. The filter formed according to the invention had a 79% average transmission across the visible spectrum.

In another test polycarbonate having an average transmission of 85% across the visible spectrum was injected and fused to an ultraviolet absorbing film having an average transmission of 85% across the visible spectrum. When these filters are layered, the Beer-Lambert law predicts that transmission will experience an 85% reduction followed by another 85% reduction, wherein the total transmission is calculated as the product of the individual filters transmissions, i.e. 85%×85%=72%. The filter formed according to the invention had an 82% average transmission across the visible spectrum.

The transmission values are summarized in the following Table 1—Transmission Values (in per cent, %) at 50 nm Increments. In Table 1, column 50 lists the wavelengths across the visible spectrum at which the transmission values were obtained. Note that all values in the columns 52 through 62 are percent (%) transmission values. Column 52 indicates the transmissions at the listed wavelengths, and at the bottom of the column, average transmission of a Bayer brand water white (clear) polycarbonate substrate. Column 54 indicates the transmissions, and average transmission, of a 3M brand organic, optical, dielectric film. Column 56 indicates the Beer-Lambert expected transmission of layering the substrate on the film. Column 58 indicates the actual transmissions of the layered ensemble. This represents the At the same time that the transmission values were calculated, applicants obtained the photopic and scotopic transmission values for the polycarbonate, the film, the layered ensemble and the fused ensemble. The photopic and scotopic transmissions are equal to the individual transmissions (T) integrated over all visible wavelengths ($\lambda$) from 380 nm to 780 nm weighted by the Photopic or Scotopic Sensitivity Function values for that wavelength, namely $P_\lambda$ or $S_\lambda$ further weighted by the reference Illuminant curve. Typically illuminant curve C ($I_C$) is employed as the spectrum which best simulates daylight over the visible range. Thus, the photopic or scotopic value is an integral of three products T, P and $I_C$, over the integral of two products, P and $I_C$. The denominator is unity since the P and $I_C$ curves represent the normalized 100% reception of available light. The formula for calculating the photopic is as follows:

$$\% \text{ Photopic} = \frac{\int_{nm=380}^{nm=780} T_\lambda \cdot P_\lambda \cdot I_{C,\lambda} d\lambda}{\int_{nm=380}^{nm=780} P_\lambda \cdot I_{C,\lambda} d\lambda}$$

The water white polycarbonate of column 52 had a % P of 87.3 and a % S of 86.7. The film of column 54 had a % P of 86.7 and a % S of 86.2. The layered ensemble had a % P of 75.7 and a % S of 74.4. These lowered % P and S values correlate to the transmission loss reflected in the expected and actual wavelength-based transmission data of columns 56 and 58. Consistent with the unexpectedly high transmission values of column 60, the molded ensemble according to the invention, had a % P of 84.9 and a % S of 82.3. These values represent a 12.2 and a 10.6% increase, respectively, over the layered values.

Laser Welding Example

A radiation absorbing material was coated onto a polycarbonate flat and a film was placed over the coated surface. The ensemble was irradiated through the polycarbonate with a 940 nm diode laser operating at 50 watts with a 4 mm wide beam. The beam rastered the ensemble at 1/32 inch spacing between parallel runs. In areas where the beam overlapped a previous run, the total energy delivered to the film exceeded the delamination threshold resulting in localized destruction of the film's optical properties. In other areas the film was fixedly laminated to the polycarbonate while retaining its optical properties. It is anticipated that a more uniform irradiation than provided by rastering would provide even better results.

Add-on Filter Examples

FIGS. 3A, 3B, 3C and 3D all show a plastic and film ensemble formed according to the invention and illustrated in FIG. 2. The completed plastic and film ensemble is referred to here as plastic/film 50 and includes the plastic side 50a and the film side 50b. The additional layers, coatings and optical filters shown here are exemplary of optical devices that could be combined with the plastic and film ensemble according to the invention. The drawings illustrate certain types and configurations, although it should be understood that additional types and configurations may also be utilized, as will be described more completely below.

Figure 3A:
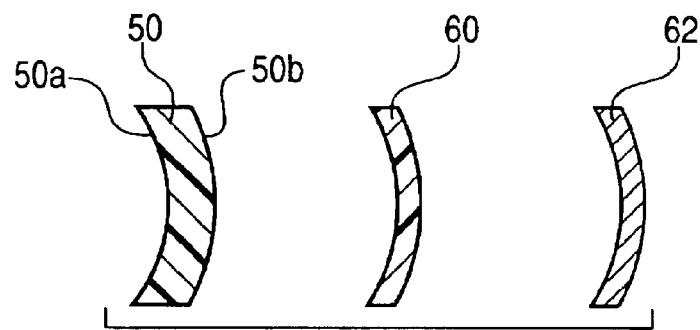
FIG. 3A is an exploded cross-sectional view of a lens formed according to the invention provided with a hardcoat layer and an anti-reflective layer.

FIG. 3A shows a hardcoat or hardcoat layer 60 placed over the film side 50b of the plastic/film 50. Hardcoat 60 provides a layer of protection for the film, for example, scratch resistance. Hardcoat 60 also provides a surface to receive an anti-reflection layer or coating 62. If hardcoat 60 is applied via a dip coating process, then plastic side 50a will be provided with a hardcoat layer also. An anti-reflection layer may also be provided on the hardcoat layer on plastic side 50a of plastic/film 50. Throughout the remainder of this specification, an anti-reflection layer means a sputtered metal halide layer, a sputtered metal calcide layer, a rugate, a dielectric stack, or combinations thereof. The metal halide layers include metals combined with Fluorine, Chlorine, Bromine or Iodine. Metal calcide layers include metals combined with Oxygen, Sulfur, Selenium or Tellurium. Rugates include metallic and other monolithic constructs having varying indices of refraction throughout. Dielectric stacks include metallic and other layered constructs having varying indices of refraction from layer to layer.

Figure 3B:
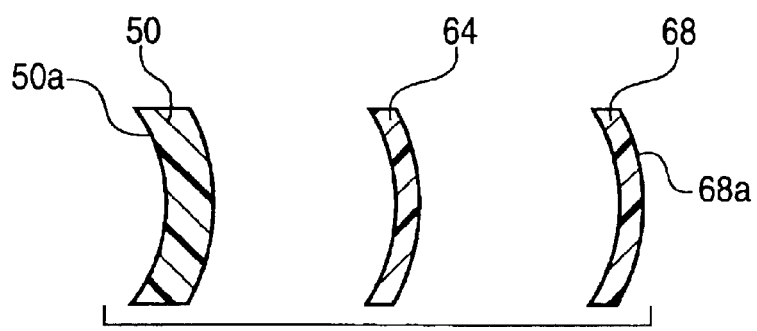
FIG. 3B is an exploded cross-sectional view of a lens formed according to the invention provided with a hologram and a protective cap.

FIG. 3B shows a hologram 64 disposed on the film side of plastic/film 50. A protective optical cap 68 is disposed on hologram 64. An anti-reflection coating may be provided on plastic side 50a and/or cap exterior 68a.

Figure 3C:
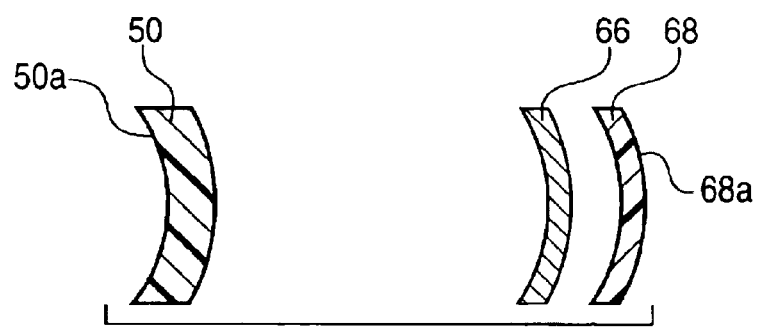
FIG. 3C is an exploded cross-sectional view of a lens formed according to the invention provided with an inorganic dielectric stack and a protective cap.

FIG. 3C shows a metal oxide dielectric stack 66 sputtered onto the interior of cap 68. In the event that optically curved surfaces are present, it is preferable that stack 66 be sputtered onto a concave surface, as shown. The interference spectrum of metal oxide stack 66 is intended to complement the interference spectrum of the organic dielectric film incorporated into plastic/film 50. An anti-reflection coating may be provided on plastic side 50a and/or cap exterior 68a.

Figure 3D:
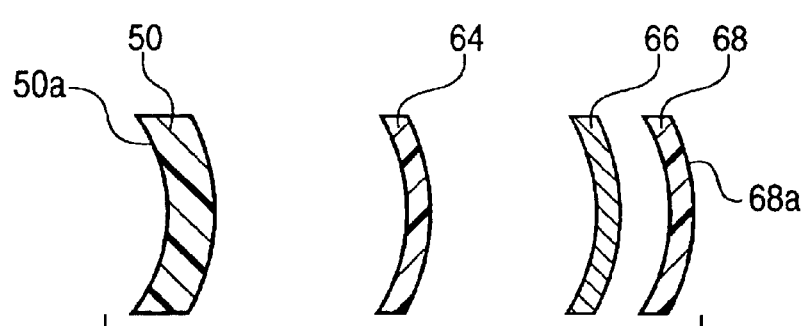
FIG. 3D is an exploded cross-sectional view of a lens formed according to the invention provided with a hologram, an inorganic dielectric stack and a protective cap.

FIG. 3D shows a hologram 64 disposed on the film side of plastic/film 50. There is also shown a metal oxide dielectric stack 66 sputtered onto the interior of cap 68. An anti-reflection coating may be provided on plastic side 50a and/or cap exterior 68a.

What is claimed is:

1. An optical filter having a thermoplastic substrate supporting an organic, dielectric, optical film without substantially reducing the net integrated transmission properties of the film along an optical path comprising:
   a dielectric film including (i) repeating optical layers of at least two polymers having different refractive indexes from each other, (ii) an exterior surface material, (iii) a delamination threshold based on total thermal energy delivered to the film;
   a thermoplastic substrate which is miscible with the exterior surface material of the film and which is disposed in the same optical path as said dielectric film; and
   a polydisperse region comprising a mixture of said exterior surface material and said thermoplastic substrate located in the optical path between said film and said substrate, wherein said polydisperse region providing improved optical transmission along the optical path in the transition from said film to said thermoplastic substrate.

2. The filter of claim 1, wherein said exterior surface material has a first melting temperature range and said thermoplastic substrate has a second melting temperature range that overlaps said first melting temperature range.

3. The filter of claim 1, wherein said thermoplastic substrate includes an organic absorber dye.

4. The filter of claim 3, additionally including a hologram disposed thereon.

5. The filter of claim 3, wherein said organic absorber dye is selected from the group consisting of a UV absorbing dye, a visible light absorbing dye, a cosmetic dye, a laser absorbing dye, a near infrared absorbing dye, an infrared absorbing dye and combinations thereof.

6. The filter of claim 5, additionally including a hologram disposed thereon.

7. The filter of claim 1, additionally including a hologram disposed thereon.

8. The filter of claim 1, further comprising an anti-reflection coating applied to the thermoplastic material.

9. The filter of claim 8, wherein the anti-reflection coating is selected from the group consisting of a metal halide, a metal calcide, a rugate, a dielectric stack and combinations thereof.

10. The filter of claim 8, wherein the anti-reflection coating includes a metal.

11. The filter of claim 1, further comprising a hardcoat layer applied to the organic, dielectric optical film.

12. The filter of claim 11, additionally comprising an anti-reflection coating applied to the hardcoat layer.

13. The filter of claim 12, wherein the anti-reflection coating is selected from the group consisting of a metal halide, a metal calcide, a rugate, a dielectric stack and combinations thereof.

14. The filter of claim 12, wherein the anti-reflection coating includes a metal.

15. The filter of claim 1, further comprising a hardcoat layer applied to the thermoplastic material.

16. The filter of claim 15, additionally comprising an anti-reflection coating applied to the hardcoat layer.

17. The filter of claim 16, wherein the anti-reflection coating is selected from the group consisting of a metal halide, a metal calcide, a rugate, a dielectric stack and combinations thereof.

18. The filter of claim 16, wherein the anti-reflection coating includes a metal.

19. The filter of claim 1, further comprising a hologram applied to the organic, dielectric optical film.

20. The filter of claim 19, additionally comprising a protective optical cap applied to the hologram.

21. The filter of claim 20, additionally comprising an anti-reflection coating applied to the cap.

22. The filter of claim 21, wherein the anti-reflection coating is selected from the group consisting of a metal halide, a metal calcide, a rugate, a dielectric stack and combinations thereof.

23. The filter of claim 21, wherein the anti-reflection coating includes a metal.

24. The filter of claim 20, comprising a metal dielectric stack disposed between the hologram and the cap.

25. The filter of claim 24, wherein the cap includes a concave side with the metal dielectric stack sputtered onto the concave side.

26. The filter of claim 24, additionally comprising an anti-reflection coating applied to the cap.

27. The filter of claim 26, wherein the anti-reflection coating is selected from the group consisting of a metal halide, a metal calcide, a rugate, a dielectric stack and combinations thereof.

28. The filter of claim 26, wherein the anti-reflection coating includes a metal.

29. The filter of claim 1, further comprising a protective optical cap with a metal dielectric layer disposed between the cap and the organic, dielectric optical film.

30. The filter of claim 29, wherein the cap includes a concave side with the metal dielectric stack sputtered onto the concave side.

31. The filter of claim 29, additionally comprising an anti-reflection coating applied to the cap.

32. The filter of claim 31, wherein the anti-reflection coating is selected from the group consisting of a metal halide, a metal calcide, a rugate, a dielectric stack and combinations thereof.

33. The filter of claim 31, wherein the anti-reflection coating includes a metal.

* * * * *